US008661263B2

(12) United States Patent
Mattsson (10) Patent No.: US 8,661,263 B2
(45) Date of Patent: Feb. 25, 2014

(54) META-COMPLETE DATA STORAGE

(75) Inventor: Ulf Mattsson, Cos Cob, CT (US)

(73) Assignee: Protegrity Corporation, Stamford, CT (US)

( * ) Notice: Subject to any disclaimer, the term of this patent is extended or adjusted under 35 U.S.C. 154(b) by 1242 days.

(21) Appl. No.: 11/904,791

(22) Filed: Sep. 27, 2007

(65) Prior Publication Data
US 2008/0082834 A1    Apr. 3, 2008

Related U.S. Application Data

(60) Provisional application No. 60/848,251, filed on Sep. 29, 2006.

(51) Int. Cl.
*G06F 12/14* (2006.01)
*G06F 21/62* (2013.01)

(52) U.S. Cl.
CPC .................................. *G06F 21/6227* (2013.01)
USPC ........................................................ 713/189

(58) Field of Classification Search
CPC .................................................. G06F 21/6227
USPC ........................................................ 713/189
See application file for complete search history.

(56) References Cited

U.S. PATENT DOCUMENTS

| 6,122,378 | A  | * | 9/2000 | Yoshiura et al. | 380/217 |
|---|---|---|---|---|---|
| 6,154,542 | A  | * | 11/2000 | Crandall | 380/28 |
| 6,249,866 | B1 | * | 6/2001 | Brundrett et al. | 713/165 |
| 6,957,330 | B1 | * | 10/2005 | Hughes | 713/163 |
| 7,149,722 | B1 | * | 12/2006 | Abburi | 705/59 |
| 7,212,635 | B2 | * | 5/2007 | Nishikawa | 380/213 |
| 7,221,756 | B2 | * | 5/2007 | Patel et al. | 380/37 |
| 7,222,231 | B2 | * | 5/2007 | Russell et al. | 713/165 |
| 7,269,564 | B1 | * | 9/2007 | Milsted et al. | 705/1.1 |
| 7,376,680 | B1 | * | 5/2008 | Kettler et al. | 1/1 |
| 7,418,098 | B1 | * | 8/2008 | Mattsson et al. | 380/28 |
| 7,428,636 | B1 | * | 9/2008 | Waldspurger et al. | 713/164 |
| 7,484,092 | B2 | * | 1/2009 | Rajasekaran et al. | 713/165 |
| 7,536,549 | B2 | * | 5/2009 | Ishizaki et al. | 713/167 |
| 7,536,558 | B2 | * | 5/2009 | Neble et al. | 713/189 |
| 7,558,968 | B2 | * | 7/2009 | Sakaguchi | 713/189 |
| 7,669,225 | B2 |   | 2/2010 | Peled et al. | |
| 7,814,316 | B1 | * | 10/2010 | Hughes et al. | 713/160 |
| 7,864,952 | B2 | * | 1/2011 | Pauker et al. | 380/28 |
| 7,890,459 | B1 | * | 2/2011 | Linstead | 707/610 |
| 7,934,105 | B1 | * | 4/2011 | Buckingham | 713/193 |
| 8,045,714 | B2 | * | 10/2011 | Cross et al. | 380/277 |
| 8,135,948 | B2 | * | 3/2012 | Shulman et al. | 713/153 |

(Continued)

FOREIGN PATENT DOCUMENTS

JP    2000 267940 A    9/2002
WO    WO 00/05642 A1    2/2000

OTHER PUBLICATIONS

European Extended Search Report, European Application No. 07117665.5, Oct. 1, 2012, 6 pages.

*Primary Examiner* — Taghi Arani
*Assistant Examiner* — James Turchen
(74) *Attorney, Agent, or Firm* — Fenwick & West LLP (57) ABSTRACT

The invention described herein generally relates to systems and methods of securely storing data so that the data contains information about the data and/or the encryption of the data, systems and methods of providing secure access to real world data through data transformations, and systems and methods of managing security parameters for data.

22 Claims, 10 Drawing Sheets

(56) References Cited

U.S. PATENT DOCUMENTS

| | | |
|---|---|---|
| 2003/0016821 A1 | 1/2003 | Hammersmith |
| 2003/0026429 A1 | 2/2003 | Hammersmith |
| 2003/0026431 A1 | 2/2003 | Hammersmith |
| 2003/0091186 A1* | 5/2003 | Fontijn et al. .................. 380/201 |
| 2004/0003251 A1 | 1/2004 | Narin et al. |
| 2004/0022390 A1* | 2/2004 | McDonald et al. ............ 380/277 |
| 2005/0169473 A1* | 8/2005 | Candelore ...................... 380/239 |
| 2006/0002559 A1* | 1/2006 | Kachi ............................. 380/270 |
| 2006/0047977 A1 | 3/2006 | Hanasaki |
| 2006/0218647 A1 | 9/2006 | Hars et al. |
| 2006/0265330 A1 | 11/2006 | Fukasawa |
| 2007/0055891 A1 | 3/2007 | Plotkin et al. |
| 2007/0074047 A1* | 3/2007 | Metzger et al. ................ 713/193 |
| 2007/0079119 A1 | 4/2007 | Mattsson et al. |
| 2007/0083467 A1* | 4/2007 | Lindahl et al. .................. 705/50 |
| 2007/0083928 A1 | 4/2007 | Mattsson et al. |
| 2008/0066144 A1* | 3/2008 | Greco et al. ...................... 726/1 |
| 2010/0074441 A1 | 3/2010 | Pauker et al. |

* cited by examiner

META-COMPLETE DATA STORAGE

RELATED APPLICATIONS

This application claims priority to U.S. Provisional Patent Application 60/848,251, filed Sep. 29, 2006, the contents of which are incorporated in its entirety.

TECHNICAL FIELD

This application relates to systems and methods of data storage and transport and more particularly to storing encrypted data such that the data contains sufficient information to decrypt the data.

BACKGROUND INFORMATION

The use of encryption to protect sensitive data is well-known. A variety of encryption algorithms exist described in texts such as described in Andrew S. Tanenbaum, *Computer Networks* 724-71 (4th ed. 2003). In order to decrypt encrypted data, one must possess one or more pieces of information such as an encryption key, the encryption algorithm, and an initialization vector (IV). While such data may be kept in repositories, including electronic repositories such as hardware security modules, the movement and decryption of sensitive data still proves challenging as data is moved within an enterprise and beyond.

Moreover, there is a business need for a middle-ground between encryption and clear-text data. The same encryption that prevents human eyes and untrusted systems and from reading sensitive data can also hamper trusted or semi-trusted systems, applications, which have a business need to review or operate on the data.

SUMMARY OF THE INVENTION

The invention described herein generally relates to systems and methods of securely storing data so that the data contains information about the data and/or the encryption of the data, systems and methods of providing secure access to real world data through data transformations, and systems and methods of managing security parameters for data.

In one aspect, the invention generally relates to a method for securely storing data comprising encrypting a clear-text datum, storing the encrypted datum, and storing metadata about the encrypted datum. Embodiments according to this aspect of the invention can include various features. For example, the combined length of the encrypted datum and the metadata can be equal to or less than the length of the clear-text datum. The encrypted datum and the metadata may be stored in the same element. The data may be encrypted using an initialization vector and the metadata may comprise the initialization vector.

The method may include computing an integrity value for the unencrypted datum, wherein the metadata comprises the integrity value. The integrity value may include checksums, parity bits, check digits, redundancy checks, longitudinal redundancy checks, vertical redundancy checks, cyclic redundancy checks, hash functions, and cryptographic hash functions.

The data may be encrypted using an encryption key and the metadata may comprise a key identifier for the encryption key. The metadata may comprise recovery information.

In another aspect, the invention generally relates to a method for providing selective access to a string of characters comprising encrypting a first subset of the string of characters, and combining the first subset of characters with an unencrypted subset of the string of characters to produce a partially encrypted string.

Embodiments according to this aspect of the invention can include various features. For example, the method may also include encrypting a second subset of the string of characters, and combining the second subset of the string of characters with the unencrypted subset of characters. The method may include storing the partially encrypted string in a fully encrypted file. In other embodiments, the method may include storing the partially encrypted string in a fully encrypted database.

In another aspect, the invention generally relates to a method of secure, error-resistant data storage comprising encrypting at least one datum using an initialization value, storing a recovery value for the initialization value, and storing an integrity value for one or more of the at least one datum.

Embodiments according to this aspect of the invention can include various features. For example, the recovery value and the integrity value may be stored in the same element. The method may include storing a security policy for at least one datum. The integrity value may be selected from the group consisting of: checksums, parity bits, check digits, redundancy checks, longitudinal redundancy checks, vertical redundancy checks, cyclic redundancy checks, hash functions, and cryptographic hash functions.

In another aspect, the invention generally relates to a data management user interface for a data field comprising a GUI element for selecting a data policy option for each character in the data field. In some embodiments, the GUI element is a radio button. The GUI element may also be selected from the group consisting of: a button, a combo box, a combutcon, a context menu, a check box, a dialog box, a drop-down list, an icon, a list box, a menu, a pie menu, a slider, a spinner, a tab, a text box, and a widget. The data policy option may be at least one selected from the group consisting of: clear text, masked text, data type preserving encryption, advanced encryption standard, and triple data encryption standard. The interface may also include a GUI element for designating one or more characters as an intialization value and/or a GUI element for designating one or more characters as a key ID.

In another aspect, the invention generally relates to a method of data storage comprising encrypting one or more characters of a datum, storing the encrypted characters with one or more clear text characters of the datum, searching on the clear text characters to produce a subset of records, and searching on the encrypted characters of the subset of records. In one embodiment, searching on the clear text includes pattern matching. In another embodiment, searching on the encrypted characters includes decrypting the encrypted characters.

BRIEF DESCRIPTION OF THE DRAWINGS

The drawings generally are to illustrate principles of the invention and/or to show certain embodiments according to the invention. The drawings are not to scale. Like reference symbols in the various drawings generally indicate like elements. Each drawing is briefly described below.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DESCRIPTION

As legislation and public concern over well-publicized security breaches pushes organizations to better secure their data, it is no longer acceptable to encrypt data only when it is stored in a database. Rather, data should be continuous encrypted as it moves throughout an enterprise and beyond. Users should have the capability to seamlessly and securely move encrypted data from database server to a laptop for their sales force. Similarly, as businesses become more dependent on encryption, performance issues become increasingly salient. Organizations need to be able to perform maintenance tasks such as key rotation without suffering an unacceptable level of downtime.

The invention described herein addresses these demands with methods and systems of meta-complete data, i.e., "data that knows about itself." Such data may be transported throughout the enterprise and beyond without additional "baggage," allowing for quick and secure transport of data and requiring minimal modifications of existing data infrastructure.

Several embodiments of the invention are explained through an explanation of the applicability of each embodiment to data encrypted with Data Type Preservation (DTP). However, the invention described herein is applicable to many types of encryption.

Data Type Preservation (DTP) is often referred to as a cryptographic algorithm. But DTP is not a cryptographic algorithm of its own; it's based on standard block ciphers like DES and AES. DTP should rather be regarded as a complementary mode of operation for these ciphers, as compared to standard modes like CFB (Cipher Feedback) and OFB (Output Feedback). Data Type Preservation is described in detail in U.S. patent application Ser. No. 09/721,942, filed Nov. 27, 2000, the contents of which are hereby incorporated by reference herein.

Similar to CFB and OFB, DTP is a stream cipher mode. The block cipher in question generates a stream of pseudo-random data used in the encryption process. But where the other modes produce cipher text by exclusive-ORing the pseudorandom data with some plain text, DTP produces the cipher text using an add operation. The feedback for the block cipher input is also different. When encrypting with a mode like CFB, each cipher text byte can have 256 different values. There may however by circumstances when it's not possible to store all of these 256 values, for instance when there is a restriction that only numeric characters are allowed in a field. To support storage of a restricted character set, DTP performs a modular division operation on each of the cipher text bytes. This operation produces cipher text that fits into the character set allowed. Modular division is also the reason for performing an add operation instead of exclusive-OR when producing cipher text. Having different output and input sets prevents from reencryption of the same data twice. A character not part of the input set will not be encrypted. If not part of the output set, it will be left unmodified. If part of the output set, an error will be raised to prevent from interpreting the character as encrypted.

To insure that long series of identical characters will not encrypt identically, the subject technology adds a varying integer "offset" to each field and/or generates offset values based on a portion of the key being used to encrypt the data. Handling plaintexts with common prefixes or suffixes is facilitated by a string shuffled according to a permutation-invariant property of the index values (random generator) and/or insuring that plaintexts with common prefixes or suffixes do not produce ciphertext with common prefixes or suffixes. Handling adjacent characters is accomplished by shuffling the alphabet based on a portion of the encryption key and/or insuring that the encoded values of two single character strings with adjacent characters are not sequential. For example, "b" should not be encrypted as "y" whenever "a" encrypts as "x". To prevent guesses on character permutations, the subject technology inhibits guesses based on encrypted character permutations, "ripples" the data from left to right and from right to left, and hashes the key into a "starter-digit" while adding adjacent values pair-wise.

Perhaps the most important caveat for anyone who wishes to implement DTP encryption scheme is to guard against possible misinterpretation of encrypted data. Scrambled text fields such as names and addresses are not likely to be mistaken for real information, but numeric fields may contain quite plausible values. A legitimate user who, through some administrative oversight, is erroneously presented with encrypted data may not recognize it as such and make bad decisions as a result.

Storage of Initialization Vectors

Figure 1:
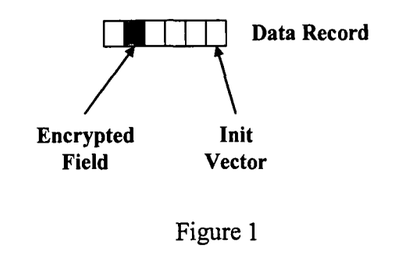
FIG. 1 illustrates how an initialization vector used to encrypt data in a record/row may be stored in meta data
Figure 2:
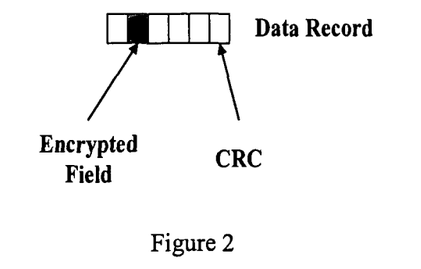
FIG. 2 illustrates how a CRC value or truncated CRC value for the clear text data in a record/row may be stored in meta data.

Referring to FIGS. 1 and 2, the DTP encryption scheme is consistent in that the same plaintext always results in the same ciphertext. Consistent encryption exposes the data to the possibility of a statistical attack. If an attacker knows the relative frequency of specific data items, such as medical tests, he can deduce the corresponding encrypted values. This kind of attack can be stymied by using a value from another field (the table's primary key, for example) as an initialization vector (IV) to modify the encryption key. When using DTP, as well as CFB mode, identical plain texts will have different cipher texts if different IVs are used when encrypting. Since DTP produces a cipher text having the same length as the plain text, a unique IV has to be stored outside of the encrypted field.

When using such an external IV, it must be ensured that the IV value can't be modified without also modifying the encrypted value; otherwise the value can't be decrypted correctly.

Under some circumstances, such a constant external IV is not possible to retrieve. In this case one may consider using some type of fixed IV. Using a fixed IV degrades the strength of the DTP cipher text. DTP utilizes a modular addition during encryption, which for the first byte as above is as follows:

$$c1 = (p1 + o18) \bmod N$$

When using a fixed IV and the same secret key, o18 will be constant. This means that if knowing one pair of c1 and p1, the constant o18 can be retrieved, and from this the value p1 for all different values of c1. Since p1 is shuffled into the DTP encryption process, the value o28 used for the second encryption will normally not be constant. It may have as many different values as p1. But if p1 is constant, o28 will be too. Based on this utilization of fixed IV value is not recommended, though possible.

Partial Encryption of a Field/Column

Figure 3:
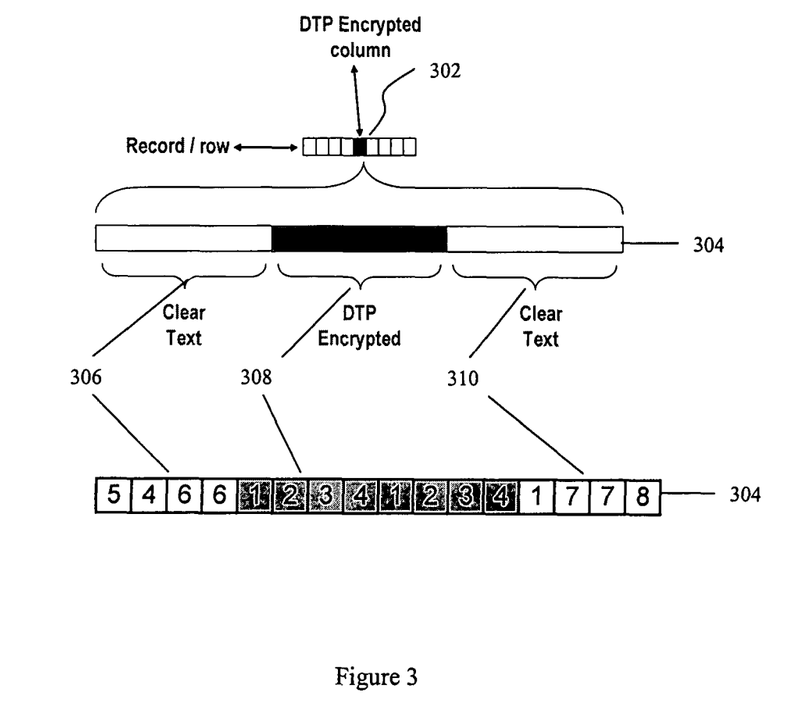
FIG. 3 depicts an example of partial encryption of a field/column, in this case, a credit card number.

FIG. 3 is an example of partial encryption of a field/column for a common credit card number (i.e., 4+8+4). A column 302 is encrypted using an encryption algorithm in conjunction with DTP. For one or more rows 304, the first four digits 306, the last four digits 310 are stored as clear text, while the middle eight digits 308 are encrypted. This allows a user to view portions of the credit card number (e.g. for validation purposes) while protecting other portions of the credit card number.

Figure 4:
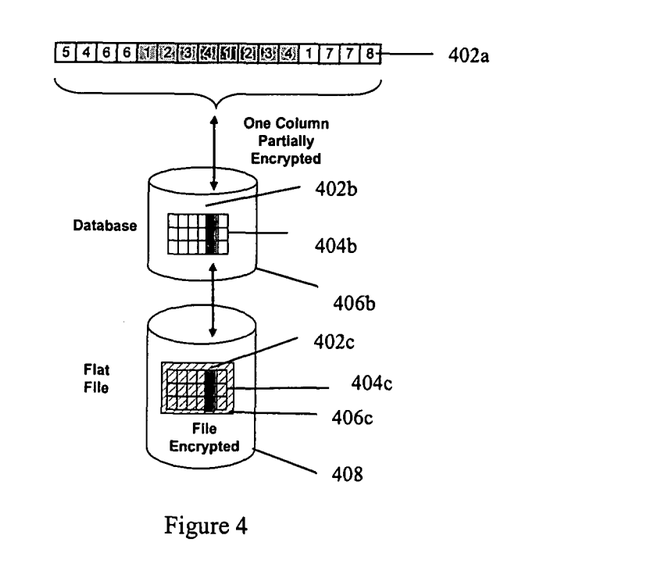
FIG. 4 depicts an example of partial encryption of a database column with double encryption at the file level.

FIG. 4 is an example of Partial Encryption of a database column combined with double encryption at the file level. A column 402 is partially encrypted, perhaps, but not necessarily as shown and in explained in FIG. 3. The column 402 resides in a table 404b in a database 406b. The database 406b may be stored as an encrypted flat file 408. The file 408 contains the database 406c, table 404c and partially encrypted column 402c.

Figure 5:
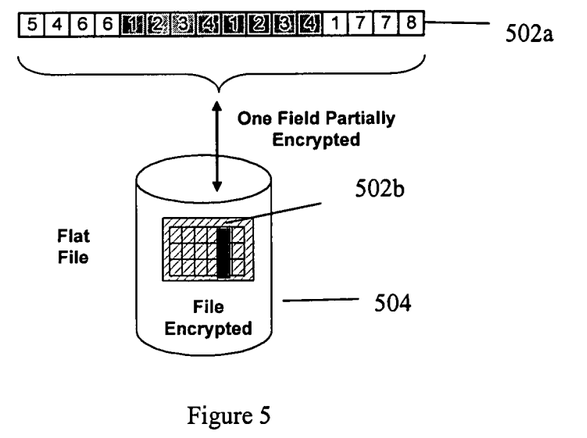
FIG. 5 depicts an example of partial encryption of a field in a flat file with double encryption at the file level.

FIG. 5 is an example of partial encryption of a field in a flat file combined with double encryption at the file level. As in FIG. 4, a column 502 is partially encrypted, perhaps, but not necessarily as shown and in explained in FIG. 23. The column is part of an encrypted flat file 504.

Search on Encrypted Fields

The partial encryption concept described above can be applied to improve search performance on encrypted feeds. Referring to Table 1 below, searching on one or more leading characters of a column will be much faster than performing full scans of the original table. Depending on the distribution of the values within the column, different performance gains are accomplished due to the selectivity of such a "wild card" search. Table 1 is an exemplary table that contains Name, Address, and also a row-identifier (#).

TABLE 1

| # | Name  | Address    |
|---|-------|------------|
| 1 | SMITH | RIVER LANE |

Referring to Table 2 below, an outline of how to proceed with a solution based on a basic indexing mechanism is illustrated. The solution is based on storing the ASI value in some of positions. In the example, store the ASI value 'S' in the first position. ABCD are the DTP values for positions 2-5. By using a basic indexing mechanism, like clustering index, on the Name column, a physical row sequence results that is based on the ASI values for each row. A WHERE clause with LIKE search or other pattern matching search on the first position can be performed with performance as on nonencrypted data. Transparency will depend on if the information that the application needs is provided in clear text (partially encrypted fields or fields that are not part of the search criteria).

TABLE 2

| # | Name  | Address    |
|---|-------|------------|
| 1 | SABCD | RIVER LANE |

Pattern matching, including pattern matching with regular expressions is well known and is described in Ramez Elmasri & Shamkant B. Navathe, *Fundamentals of Databse Systems* 261-62 (5th ed. 2007) and H. M. Deitel, et al., *Perl: How to Program* 253-83 (2001), the contents of which are both incorporated by reference herein.

The above embodiment may be modified to reflect various data characteristics found in real world data. Pattern matching search on plain text characters potentially suffer from two drawbacks.

The first is that plain text characters may serve as a poor discriminant by returning a disproportionate number of records when a pattern matching search is performed. For example, in if in the above example, if over half of the Names in the data set began with 'S', searching on the first letter may not produce the best performance gains.

The second drawback is that storing even one plaintext character may be sufficient to compromise security. Consider for example, a database of all individuals who have served as National Security Advisor. If first character of the first name was stored as plain text, it would take little skill to identify the record of President Carter's National Security Advisor, Zbigniew Brzezinski, as it would be only record with a leading 'Z.'

The above drawback can be avoided through judicious use of the above embodiment. In particular, analysis should consider which characters locations are likely to contain a distribution of characters that approximates a uniform distribution. For example, in implementations of Structured Query Language (SQL) where the underscore (_) replaces a single character and '%' replaces zero or more characters, the following command may be used to search for a record having 'O' as the second character:

| SELECT | Fname, Lname |
|--------|--------------|
| FROM   | CUSTOMERS    |
| WHERE  | Fname LIKE '_O%'; |

Compression of DTP Encrypted Field/Column

Figure 6:
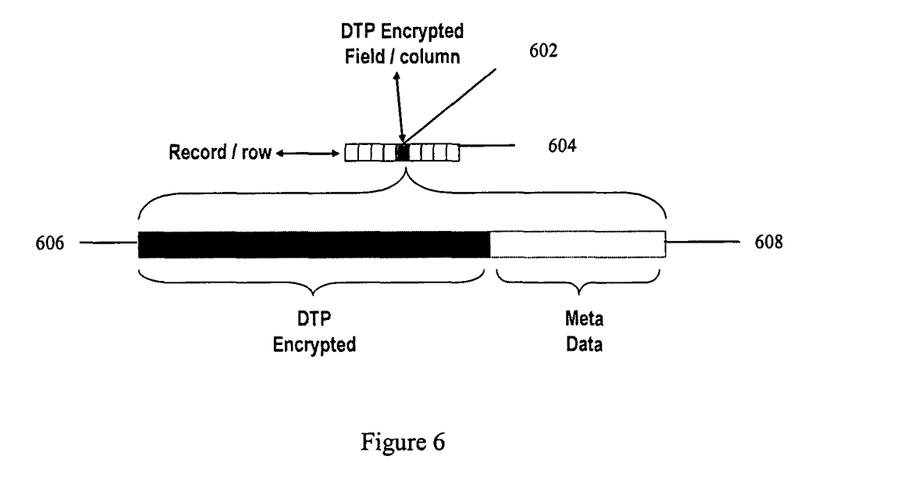
FIG. 6 depicts an example of compressed DTP encryption of a field/column which creates space for meta data to be stored within the original length of the field.

FIG. 6 is an example of compressed DTP encryption of a field/column while also allowing space for meta data to be stored within the original length of the field. A field/column 602 for one or more rows 604 contains both DTP encrypted data 606 and meta data 608. Inclusion of meta data information is dependent on the input/output characters sets. This specific solution is designed for credit card numbers that are stored as CHAR(16).

Figure 7:
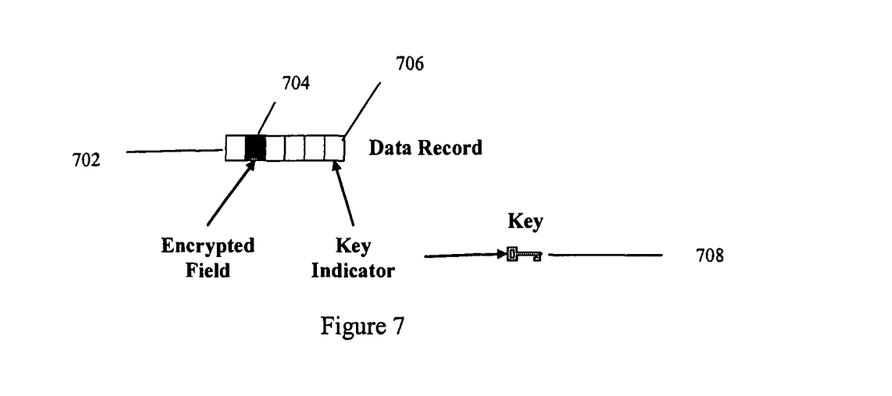
FIG. 7 depicts a key indicator which identifies what encryption key generation was used to encrypt data in a record/row.

Referring now to FIG. 7, a data record (row) 702 contains one or more encrypted field 704. The record 702 also contains a key indicator 706. The key indicator 706 provides an index to an encryption key 708 used to encrypt the record 702.

Figure 8:
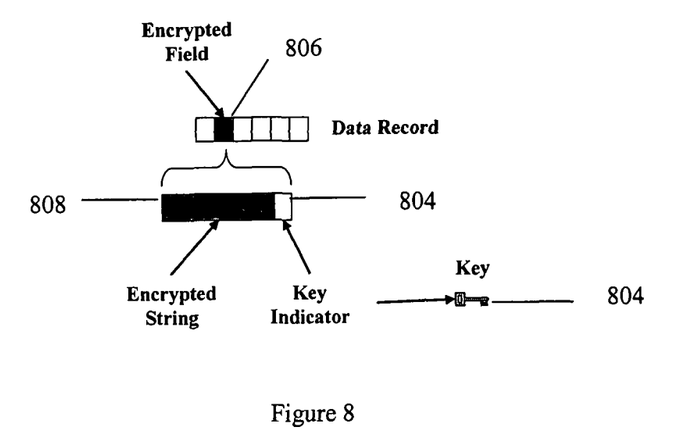
FIG. 8 depicts a key indicator stored in the same data element as an encrypted string.

Referring now to FIG. 8, a key indicator 802 identifies the encryption key 804 which was used to encrypt data in a record/row. The key indicator 802 is stored part of the encrypted field 806, in this case appended to the encrypted string 808.

Figure 9:
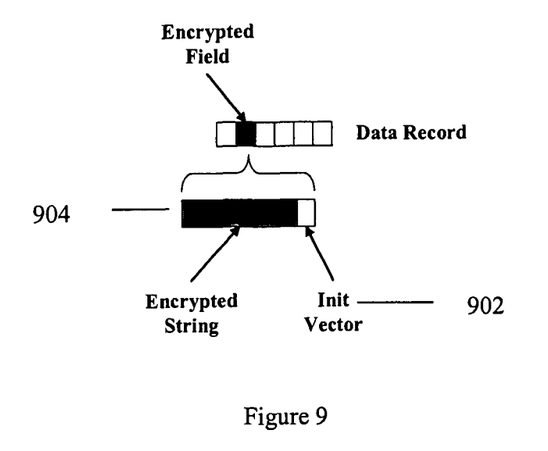
FIG. 9 depicts an initialization vector used to encrypt data in a record/row and stored in metadata.

In FIG. 9, an initialization vector 902 used to encrypt data in a record/row 904 is identified and stored or indicated in meta data. This feature would allow DTP and DTC fields to transparently include meta data in the storage format. The meta data can include Recovery information, integrity check information, key generation index, and a Rotating Initialization Vectors. A DTC algorithm will allow this compression of the storage format.

For an example of how to use the Meta Data Field in the 'DTC Transparent Metadata Mode' for credit card numbers, see the following, in an environment where it would be required from customers that are handling credit card numbers.

The "CustomerNumber" value may be used as IV. For further security, the IV may be scrambled with a secret static key before usage. CCN, the field to be encrypted is formatted as CHAR(16) in SQL.

In this example, it is desired to store three bytes of meta data containing a key index that is scrambled with the IV and the DTP output value. The key index will changed after X number of records.

The solution will compress the CCN (as explained below) so it is possible include the meta data field (e.g. a key-index) within the 16 bytes. The key index is randomly selected from a key table. The key table may at most have 26×26×26=17576 different key values (or more if the IV is also used in generating the key index). The key table may be sent in a file to the bank or credit card company, after a certificate authentication (e.g., from Verisign). The above embodiment is not dependent on all CCNs being encrypted or unencrypted. In some embodiments, the CCN fields are alphanumeric.

Recovery of DTP Initialization Vectors

Figure 10:
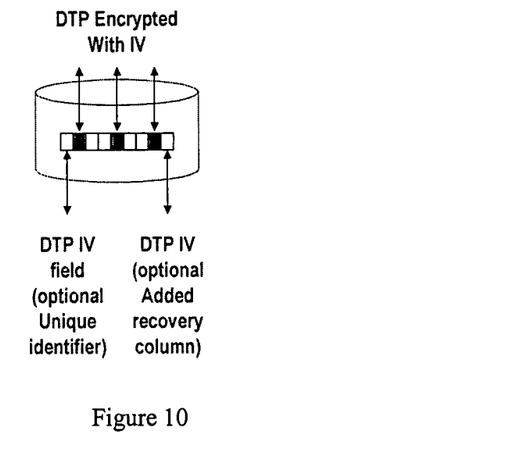
FIG. 10 depicts a row containing DTP encrypted columns and an optional DTP recovery column.

The original value from another field (the table's primary key, for example) must always be available, at decryption operations, if used to modify the encryption key. A method to ensure that the original value for the IV field is available, at decryption operations, is to store a new dedicated field for the IV value. FIG. 10 is DTP encrypted columns and an optional DTP recovery column.

Integrity of IV and DTP Encrypted Fields

Figure 11:
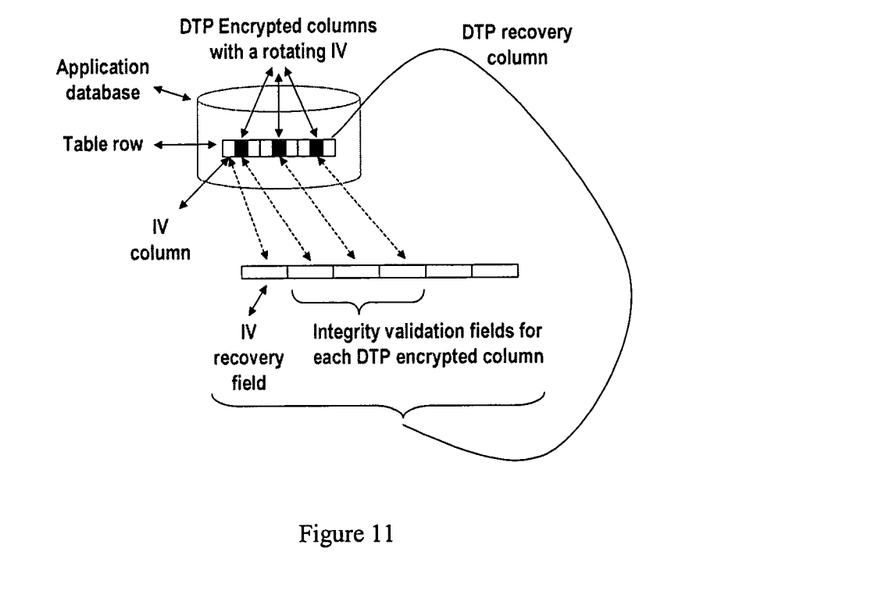
FIG. 11 depicts a row containing a DTP recovery column containing fields used to validate integrity and encryption status.

FIG. 11 depicts a DTP recovery column containing fields with information used to validate the integrity and encryption status. These fields can contain information used to validate the integrity and encryption status for each encrypted field that is contained in this row, object, or record. These fields can also contain additional information used in the recovery life cycle.

Figure 12:
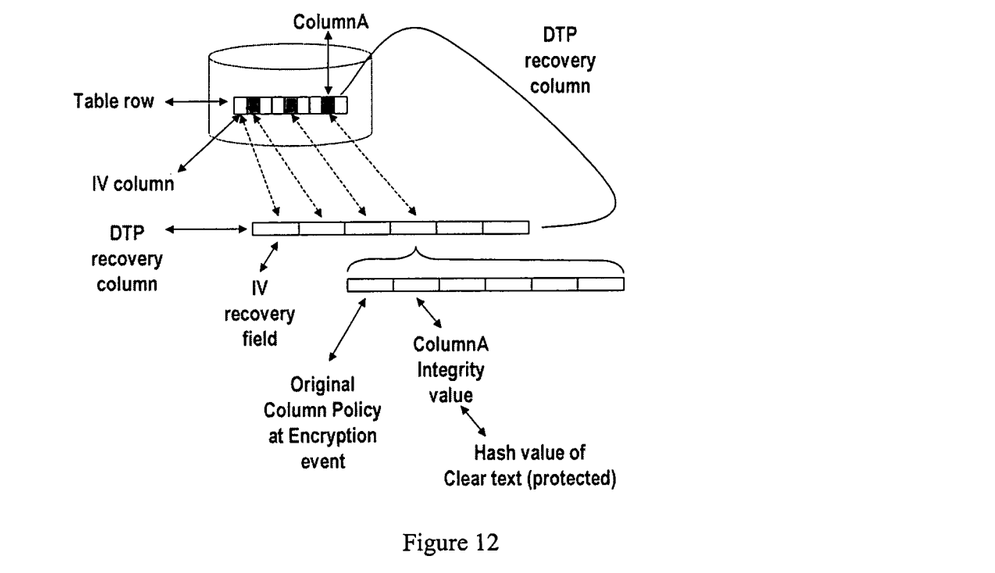
FIG. 12 depicts a DTP recovery column containing information to recover initial pre-encryption status.

FIG. 12 depicts an embodiment wherein a DTP recover column contains recovery information for a plurality of columns. This recovery information included IV recovery information, security policy information, integrity values, and hash values of clear text data.

Compression

By application of the subject method, one can balance security and transparency for field level encryption, when crossing domains, and when supporting a higher level of transparency for data in motion and data at rest. It is not desirable to encrypt with the same IV twice if using counter-mode (CTR mode) encryption. Using only the last 4 digits as IV results in only 10,000 possible different IV values:

If there are 100,000 credit card numbers (CCNs), there will on an average be 10 values encrypted with the same IV.

Looking at these values, it would likely be possible to decrypt the values, even if not knowing any clear text. The clear text bytes are restricted to '0'-'9', and each byte is XOR-ed with a constant, K. By looking at the variance, it may be possible to determine which character is '0', which is '1', and so on.

The balance is to get all this data into the field with large enough IV, so some of the meta-data might be stored in a security repository in case space in the field is limited. However, as shown in the following example, it is possible to store metadata at the cell level.

Consider a situation where a CCN is to be partially encrypted with the last four digits serving as an initialization vector and the first five digits serving as a key index. There are 16−5−4=7 digits left to encrypt. This means that the clear text data is in the range 0000000-9999999. A 3-byte integer may store be up to 16777216, i.e., it is possible represent your 7-digit number with a 3-byte integer. This means that it is possible to have 4 spare bytes, which can be assigned random values. Using these 4 bytes and the last 4 digits as IV will actually yield 5.5 bytes IV entropy.

The Key Index will point to the (Key) Domain where the data is stored. Additional metadata that may be stored includes: IV, CRC (cryptographic as an option), Policy Pointer (e.g., referring to a Data Element or Item/Object) (this could be substituted by a unique keyed), and HMACH.

Another example demonstrates the reservation of two bytes for storage of a key index. Suppose that the first 12 digits of a 16 digit credit card number are encrypted. A 12-digit number may be represented in a 5-byte integer. In this case, there are 7 spare bytes. Two of these bytes can be used for a key index, and then have the remaining 5 bytes and the 4 last digits as IV. In this case there are 65,536 ($2^{16}$) key index values, and 6.5 bytes IV entropy.

Application to Data Transfer and Key Rotation

The embodiments described herein are particularly applicable to environments where data must flow fluidly between devices. It is critical that the receiving device can decrypt the data (if authorized). By including the metadata with the sensitive data, the receiving device will have some of the required information for decryption. Moreover, in embodiments where the sensitive data is compressed, no modifications are required to database tables as the encrypted sensitive data and the corresponding meta data will fit into the same amount of space as originally allocated in the tables.

Embodiments of the invention also are applicable environments where encryption keys are changed periodically. A key objective of "key rotation" is to change encryption keys with minimal system downtime. Systems and methods of key rotation are described in U.S. Patent Application Publication No. 2007/0079119 published Apr. 5, 2007, the contents of which are incorporated by reference herein. The invention described herein allows a rotation device to quickly decrypt sensitive data and allows for the concurrent storage of data encrypted with varying encryption keys.

Moreover, in embodiments with multiple key domain names, the invention described herein facilitates the reencryption of sensitive data when crossing domains.

Basic Data Transformation Techniques

Data Privacy Tools include table and column mapping capabilities that make it easy to mask and convert data from a source database (such as a production database) to a destination database (test database). A Table Map identifies and correlates a source table with a destination table. A Column Map provides a way to control processing data on a column-by-column basis. Specifically, one may indicate how data in the source column is to be masked or transformed as it is written to the destination column.

Masking character or numeric data provides one of the most basic examples of substituting confidential data with de-identified data that is still meaningful in the context of the application test. Some of the masking functions are explained in the following paragraphs.

A string literal specifies a value for a destination column that contains alphanumeric data. One can define a string literal can be defined using any combination of characters.

The Random Function returns a value selected at random from within a range of user-specified values. This function can be used with character or numeric data, and can be especially helpful in de-identifying personal identification numbers, account numbers, telephone numbers and so on.

The Sequential Function returns a value that is incremented sequentially. A user can specify the start value and the incremental step value. This masking function can be used with character or numeric data.

The Substring Function returns a substring or portion of the content of a column. A user specifies the name of the column, the position of the first character in the string and the number of characters to use.

Data Privacy Tools allows for masking data using concatenated expressions. These expressions enable a user to define the value of a destination column by combining the values of two or more source columns or by combining a column value with some other value.

Masking Data Using Lookup Values

Another approach to de-identification is to transform data using lookup tables. A lookup table maps the value in a source column to a corresponding value for the destination column.

The Lookup Function locates the desired source value in the lookup table, and returns the corresponding value to populate the destination table. For example, assume that a Patient table contains a Diagnosis column that lists diagnostic codes.

The Random Lookup Function selects values at random from a specified lookup table to insert in a destination column. A user specifies the name of the lookup table, name of the column in the lookup table that contains the random values, and an optional limit on the number of rows from the lookup table for selecting random column values. If no limit is specified, all rows are used.

Performing Complex Data Transformations

When a user needs to perform complex data transformations that are beyond the scope of native Column Map functions, the user can prepare a user-defined exit routine or Column Map Procedure. Exit routines and Column Map Procedures are simply programs or sets of instructions that perform a specific task. These instructions are then specified in a Column Map to mask the sensitive data. Exit routines and Column Map Procedures are especially useful for generating values for destination columns that could not be defined using any other method. For example, a tester may create a customized masking algorithm to generate a value for the customer ID code, based on the customer's geographic location, average account balance and volume of transaction activity. The customer ID code generated using this algorithm is then used in a Column Map to populate a destination column.

Propagating Primary and Foreign Keys

Each of the methods described so far is effective for masking data to safeguard confidentiality. However, with relational database applications, there is an added complication. Specifically, the need to propagate a masked data element in a table to all related tables in the database in order to maintain referential integrity.

Data Privacy Tools provides a Propagate Function that assigns a value to a primary key or foreign key column and propagates that value to all related tables. A user can simply specify the desired value you want to assign to the primary or foreign key column, followed by the name of the source column.

The specified value can be a valid column name, string literal, expression or function. The column name is required only if the name and data type of the source column does not match the destination column. If a column name is not specified, the name of the destination column is used. If the customer identifier is masked using a sequential number, the masked values must be propagated to all related tables to ensure the referential integrity of the data. The ability to propagate key values ensures that the test database remains referentially intact and can produce valid test results. Imagine the complexity when there are hundreds of related tables involved, and keys must be propagated to all related tables. Without a propagate capability, many orphan tables would result and the test database would easily become corrupted.

Masking

Another way to hide sensitive data is through masking. This is different from the previous example in that the clear text cannot be reconstructed from the displayed data. This is useful in situations where it is only necessary to display a portion of the data. A good case for this method is the receipts printed at gas stations and convenience stores. When a purchase is made with a credit card, the last 4 digits of the credit are often displayed as clear text, while the rest of the credit card number has been masked with a series of X.

Obfuscation

Why would an organization want to merely obfuscate data, rather than use a strong encryption algorithm? A good example would be an audit report on a medical system. This report may be generated for an external auditor, and contain sensitive information. The auditor will be examining the report for information that indicates possible cases of fraud or abuse. Assume that management has required that Names, Social Security Numbers and other personal information should not be available to the auditor except on an as needed basis. The data needs to be presented to the auditor, but in a way that allows the examination of all data, so that patterns in the data may be detected. Encryption would be a poor choice in this case, as the data would be rendered into ASCII values outside of the range of normal ASCII characters. This would be impossible to read. A better choice might be to obfuscate the data with a simple substitution cipher. While this is not considered encryption, it may be suitable for this situation. When the auditor finds a possible case of abuse, he will need the real name and SSN of the party involved. The auditor could obtain this by calling a customer service representative at the insurance company that supplied the report, and ask for the real information. The obfuscated data is read to the customer service representative, who then inputs it into an application that supplies the real data. The importance of using pronounceable characters becomes very clear. Strong encryption would render this impossible.

DTP for Protecting Test Data

Data that is exposed or masked in a non-secure fashion in any environment can be an issue from a compliance point of view, liability issue, or an exposure to the company brand. Encryption refers to some method of modifying data so that it is meaningless and unreadable in it's encrypted form or transformed form. It also must be reasonably secure, that is it must not be easily decrypted without the proper key.

Anything less than that will be referred to as obfuscation. This is data that is rendered unusable by some means, but is not considered as a serious form of encryption. Traditionally, application software developers carry out their tests on their own local development databases. However, such local databases usually have only a small number of sample data and hence cannot simulate satisfactorily a live environment, especially in terms of performance and scalability testing. On the other hand, the idea of testing applications over live production databases is increasingly problematic. In most situations, primarily due to the fact that such use of live production databases has the potential to expose sensitive data to an unauthorized tester and to incorrectly update information in the underlying database. The subject technology can be used to secure production data and also generate databases for application software testing without revealing any confidential information from the live production databases.

Testing activities occur throughout the application lifecycle. Therefore, companies must have procedures and tools in place to thoroughly test applications and still comply with data privacy regulations. This challenge becomes more difficult when the application relies on relational databases. Deploying proven tools that make de-identifying test data easy and cost effective is essential to privacy compliance.

Traditional approaches to preserving privacy in the development and testing environments involve many of the same methods that are used successfully to secure the production environment. These methods include the following:

Deploying database security and stringent authentication schemes to manage user access to the copies of the production databases that are replicated in the development and test environments;

Documenting procedures to comply with audit requirements for protecting sensitive data;

Bonding employees who have access to sensitive data or requiring them to sign non-disclosure agreements; and Implementing physical security to segregate unauthorized personnel from the computer equipment that stores the data.

Some of these approaches are equally valid and indeed recommended for protecting development and quality assurance (QA) environments. However, when multiple IT resources are dispersed across different cities or countries, facilities like dual factor authentication and physical entry access controls can become costly to administer and manage.

In addition, these "lockdown" solutions do not address a fundamental need of application testing. Specifically, to test applications effectively, developers and testers require realistic test data—which means that IT staffers need more access to data, not less.

De-Identification Tools Provide Best Practices Solution

De-identifying test data is simply the process of systematically removing, masking or transforming data elements that could be used to identify an individual. Data that has been scrubbed or cleansed in such a manner is generally considered acceptable to use in the test environment. Data de-identification enables developers and testers to use realistic test data and produce valid test results, while still complying with privacy protection rules. However, it is important to note that the results of the data transformation have to be appropriate in the context of the application. That is, the results of data transformation must make sense to the person reviewing the test results. For example, fields containing alphabetic characters should be masked using other alphabetic characters, in the appropriate pattern. Additionally, the transformed data must be within the range of permissible values. For example, if an organization used four-digit codes ranging from 0001 to 1000, then a masked value of 2000 would not be acceptable.

To deliver thoroughly tested applications while complying with data privacy embodiments of describe invention may include:

Extracting subsets of related data. This capability improves productivity because users can create and reuse realistic and manageable, "right-sized" test databases.

Comprehensive data masking and transformation capabilities that allow users to de-identify or de-personalize test data, so users can test with realistic data and still protect privacy.

Propagating masked data elements across related database tables. This capability maintains the referential integrity of test data and ensures the validity of test results.

Intelligent browsing and editing capabilities that allow users to easily view and modify data within its relational context. For example, testers may modify data to force error and boundary conditions during testing.

Automated comparison processing that can quickly analyze differences in test results and identify problems that would otherwise go undetected. The tools should be readily available to all members participating in the development and testing process to ensure a fast, easy and resource-efficient testing program.

Figure 13:
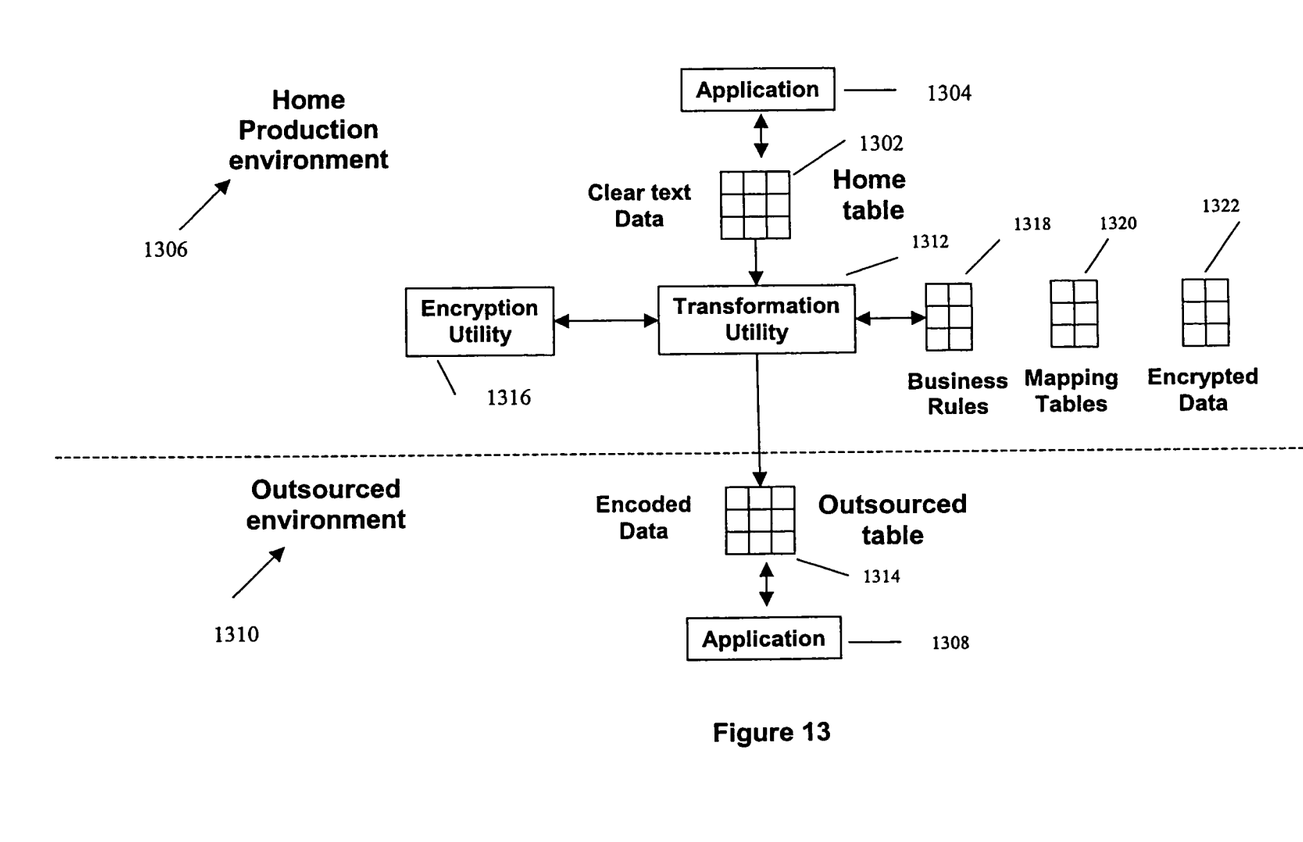
FIGS. 13 and 14 depict systems in which data may be protected through data transformation.

As depicted in FIG. 13, embodiments described may be used to provide access to a complete set of data while still protecting sensitive data. A database 1302 exists containing a data of varying sensitivity. The data is used by an application 1304 in a home production environment 1306. Access to real world data is also needed by another application 1308 in an outsourced environment 1310, perhaps for development. A transformation utility 1312 may be used to provide a database 1314 for the outsourced environment 1310. In providing database 1314, transformation utility may provide clear text data, may encrypt data using encryption utility 1316, and/or may use business rules 1318, mapping tables 1320, and tables of encrypted data 1322 to provide varying levels of protection. Business rules specify data qualities, for example the range of certain data fields.

Figure 14:
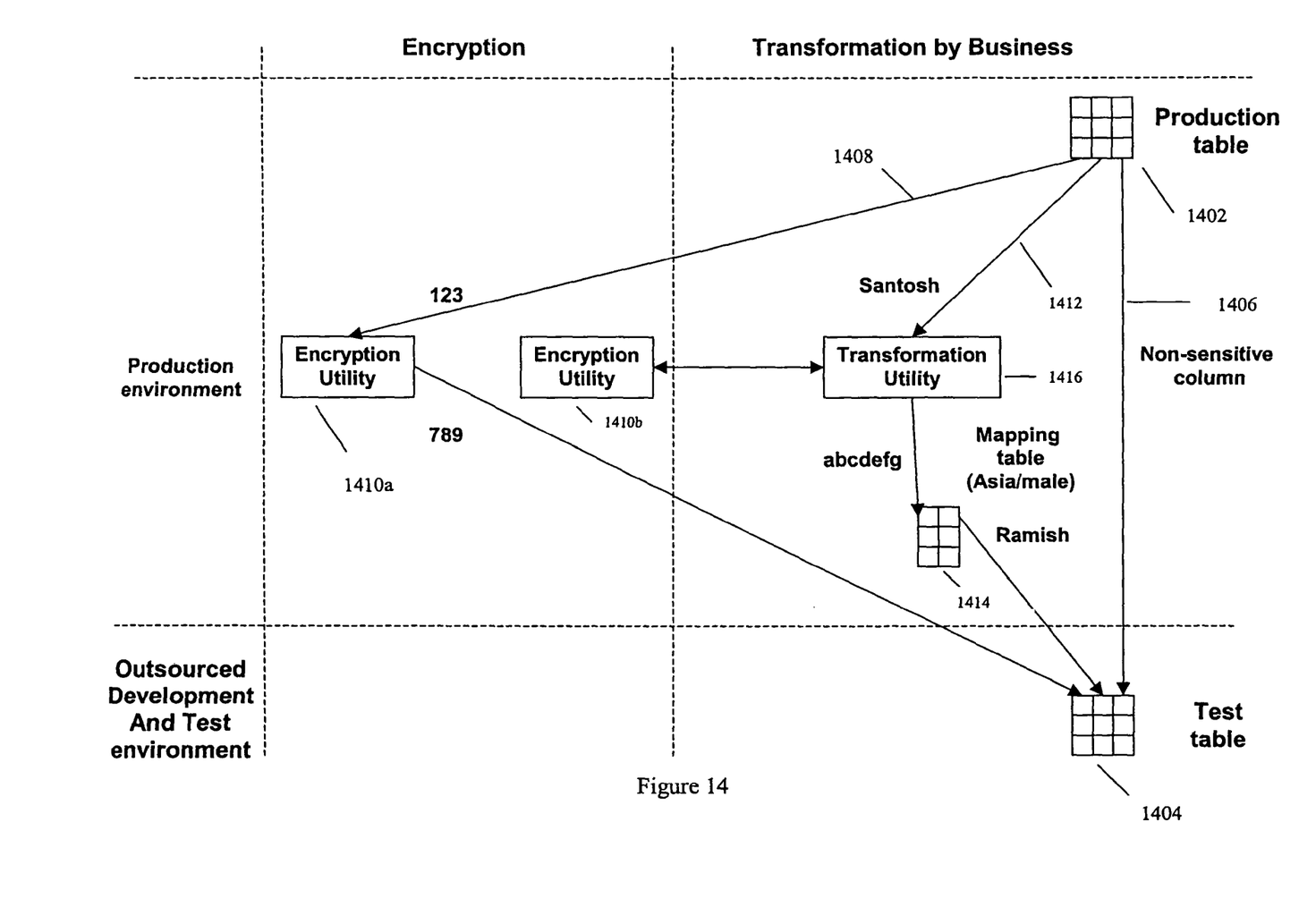

FIG. 14 depicts an exemplary operation of the system depicted in FIG. 13. Again, a production table 1402 must be protected for use as test table 1404. Non-sensitive columns 1406 exist which may be copied directly to the test table 1404. Certain columns 1408 must be encrypted using an encryption utility 1410$a$. Other columns 1412 require protection, but must be human or computer readable. In this example, a mapping table 1414 is used to change "Santosh" to "Ramish." In some embodiments, a hash function is used by the transformation utility 1416 to simplify the design of mapping table 1414. A hash function is a function h: $U \rightarrow \{0, 1, 2, \ldots, N-1\}$, wherein U is an input (in this case a password). Hash functions are well known and are described further in Giles Brassard and Paul Bratley, *Fundamentals of Algorithms* 160-61 (1996), and Bruce Schneier, *Applied Cryptography* 30-31, 351-54 (2d ed. 1996), the contents of which are hereby incorporated herein by reference. In other embodiments, an encryption utility 1410$b$ may be used to partially encrypt data which is also partially transformed. Encryption utilities 1410$a$ and 1410$b$ may be the same.

Managing Encryption

Figure 15:
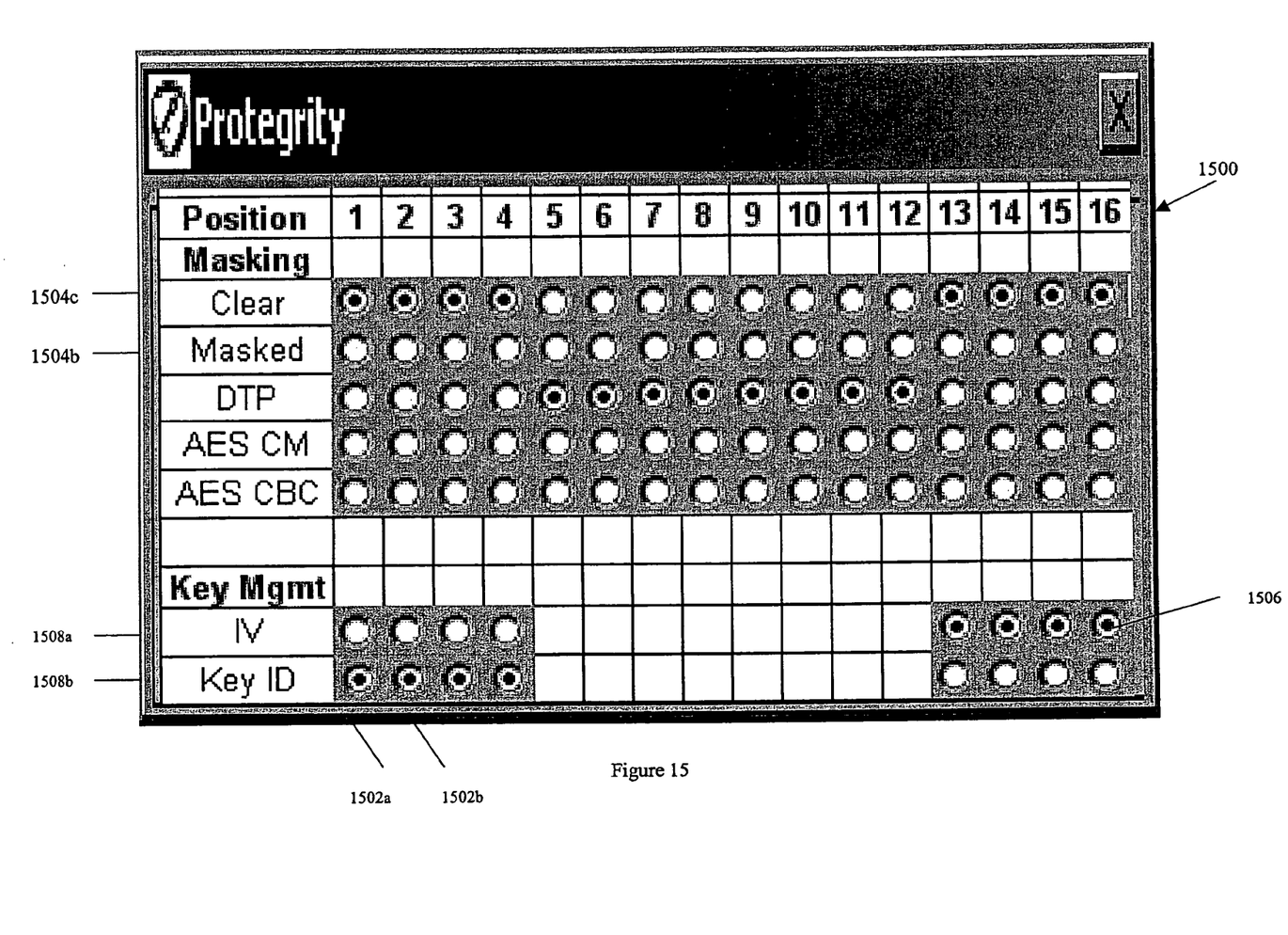
FIG. 15 depicts an interface for managing data security.

Referring to FIG. 15, a Graphical User Interface (GUI) 1500 is depicted for managing the encryption of data. Consider the CCN fields discussed above. An interface is needed to manage the various encryption options. GUI 1500 has a column 1502$a$, 1502$b$, etc. for each character position in a data field. For each character position, several options 1504$a$, 1504$b$, etc. exist for defining encryption. Radio buttons 1506 exist to select options, but other GUI elements could be substituted as is known in the art. Suitable GUI elements include, but are not limited to: a button, a combo box, a combutcon, a context menu, a check box, a dialog box, a drop-down list, an icon, a list box, a menu, a pie menu, a slider, a spinner, a tab, a text box, and a widget.

Referring to rows 1508*a* and 1508*b*, additional options may appear when a character position is designated to be stored as clear text. If the character position is stored as clear text, the character position may, but need not be, designated as an IV and/or Key ID.

GUI 1500 may be constructed using programs familiar to those of skill in the art including Microsoft VisualBasic® available from Microsoft Corp. of Redmond, Wash. and Java® available from Sun Microsystems of Santa Clara, Calif. The selections made by a user of GUI 1500 may be implemented by any means familiar to those of skill in the art including a User Defined Function.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, computers, servers and the like) shown as distinct for purposes of illustration may be incorporated within other functional elements in a particular implementation.

While the invention has been described with respect to preferred embodiments, those skilled in the art will readily appreciate that various changes and/or modifications can be made to the invention without departing from the spirit or scope of the invention.

What is claimed is:

1. A method for securely storing data comprising:
    accessing a structured datum from a location within a database, the structured datum comprising a data type and having a plurality of fields, each field corresponding to a portion of the structured datum;
    selecting a field of the structured datum, the selected field having a first length;
    encrypting a portion of the structured datum corresponding to the selected field to form an encrypted datum portion having a length less than the first length;
    replacing the portion of the structured datum corresponding to the selected field with the encrypted datum portion and metadata describing the encryption operation to form a partially encrypted datum comprising the data type, wherein the encrypted datum portion and the metadata together have a length that is equal to the first length; and
    storing the partially encrypted datum at the location within the database.

2. The method of claim 1, wherein the portion of the structured datum is encrypted using an initialization vector and wherein the metadata comprises the initialization vector.

3. The method of claim 1, wherein the metadata comprises an integrity value computed for the encrypted datum portion.

4. The method of claim 3, wherein the integrity value comprises at least one of: a checksum, a parity bit, a check digit, a redundancy check, a longitudinal redundancy check, a vertical redundancy check, a cyclic redundancy check, a hash function, and a cryptographic hash function.

5. The method of claim 1, wherein the portion of the structured datum is encrypted using an encryption key and wherein the metadata comprises a key identifier for the encryption key.

6. The method of claim 1, wherein the metadata comprises recovery information.

7. The method of claim 1, wherein the accessed structured datum comprises a clear-text credit card number, and wherein the selected field of the credit card number comprises an interior subset of credit card number digits.

8. The method of claim 1, further comprising:
    selecting a second field of the structured datum, the selected field having a second length;
    encrypting the portion of the structured datum corresponding to the selected second field to form a second encrypted datum portion having a length less than the second length; and
    replacing the portion of the structured datum corresponding to the second selected field with the second encrypted datum portion and second metadata describing the encryption operation of the portion of the structured datum corresponding to the selected second field, wherein the second encrypted datum portion and the second metadata together have a length that is equal to the second length.

9. The method of claim 8, wherein the encryption operation used to encrypt the portion of the structured datum corresponding to the selected field is different than the encryption operation used to encrypt the portion of the structured datum corresponding to the selected second field.

10. The method of claim 1, wherein a second field of the structured datum represents a second portion of the structured datum comprising clear text, and wherein the partially encrypted datum comprises the encrypted datum portion, the metadata describing the encryption operation, and the clear text represented by the second field of the structured datum.

11. A method for securely storing data comprising:
    accessing a structured clear-text datum from a database field, the clear-text datum having a first length;
    encrypting the structured clear-text datum to form an encrypted datum having a length less than the first length and comprising a same data type as the structured clear-text datum;
    storing the encrypted datum and metadata describing the encryption operation in the database field, wherein the encrypted datum and the metadata together have a length that is equal to the first length.

12. The method of claim 11, wherein the structure clear-text datum comprises a credit card number.

13. A computer-implemented method for securely storing data comprising:
    accessing, by a computer, a structured datum comprising a data type from a location within a database, the structured datum comprising a plurality of fields, each field corresponding to a portion of the structured datum;
    selecting, by the computer, a field of the structured datum, the selected field having a first length;
    encrypting, by the computer, the portion of the structured datum corresponding to the selected field to form an encrypted datum portion having a length less than the first length; and
    replacing, by the computer, the portion of the structured datum corresponding to the selected field with the encrypted datum portion and metadata describing at least one encryption operation parameter to form a partially encrypted datum comprising the data type, wherein the encrypted datum portion and the metadata together have a length that is equal to the first length; and
    storing the partially encrypted datum at the location within the database.

14. A system for securely storing data comprising:
    an input configured to access a structured datum from a location within a database, the structured datum comprising a data type and having a plurality of fields, each field corresponding to a portion of the structured datum;

an encoder comprising a processor configured to:
- select a field of the structured datum having a first length;
- encrypt a portion of the structured datum corresponding to the selected field to form an encrypted datum portion having a length less than the first length; and
- replace the portion of the structured datum corresponding to the selected field with the encrypted datum portion and metadata describing the encryption operation to form a partially encrypted datum comprising the data type, wherein the encrypted datum portion and the metadata together have a length that is equal to the first length; and an output configured to store the partially encrypted datum at the location within the database.

15. The system of claim 14, wherein the portion of the structured datum is encrypted using an initialization vector and wherein the metadata comprises the initialization vector.

16. The system of claim 14, wherein the metadata comprises an integrity value computed for the encrypted datum portion.

17. The system of claim 16, wherein the integrity value comprises at least one of: a checksum, a parity bit, a check digit, a redundancy check, a longitudinal redundancy check, a vertical redundancy check, a cyclic redundancy check, a hash function, and a cryptographic hash function.

18. The system of claim 14, wherein the portion of the structured datum is encrypted using an encryption key and wherein the metadata comprises a key identifier for the encryption key.

19. The system of claim 14, wherein the metadata comprises recovery information.

20. The system of claim 14, wherein the accessed structured datum comprises a clear-text credit card number, and wherein the selected field of the credit card number comprises an interior subset of credit card number digits.

21. A system for securely storing data comprising:
- an input configured to access a structured clear-text datum from a database field, the clear-text datum having a first length;
- an encoder comprising a processor configured to encrypt the structured clear-text datum to form an encrypted datum having a length less than the first length and comprising a same data type as the structure clear-text datum; and
- an output configured to store encrypted datum and metadata describing the encryption operation in the database field, wherein the encrypted datum and the metadata together have a length that is equal to the first length.

22. The system of claim 21, wherein the structure clear-text datum comprises a credit card number.

* * * * *